(12) United States Patent
Hiratsuka et al.

(10) Patent No.: US 11,552,287 B2
(45) Date of Patent: Jan. 10, 2023

(54) POSITIVE ELECTRODE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

(71) Applicants: Panasonic Corporation, Kadoma (JP); SANYO Electric Co., Ltd., Daito (JP)

(72) Inventors: Hidekazu Hiratsuka, Osaka (JP); Takuo Yoneda, Hyogo (JP)

(73) Assignees: PANASONIC HOLDINGS CORPORATION, Kadoma (JP); SANYO Electric Co., Ltd., Daito (JP)

( * ) Notice: Subject to any disclaimer, the term of this patent is extended or adjusted under 35 U.S.C. 154(b) by 261 days.

(21) Appl. No.: 16/640,292

(22) PCT Filed: Dec. 14, 2018

(86) PCT No.: PCT/JP2018/046007
§ 371 (c)(1),
(2) Date: Feb. 19, 2020

(87) PCT Pub. No.: WO2019/131194
PCT Pub. Date: Jul. 4, 2019

(65) Prior Publication Data
US 2021/0083270 A1    Mar. 18, 2021

(30) Foreign Application Priority Data

Dec. 27, 2017 (JP) .............................. JP2017-252476

(51) Int. Cl.
| | | |
|---|---|---|
| *H01M 4/36* | (2006.01) | |
| *C01G 53/00* | (2006.01) | |
| *H01M 4/505* | (2010.01) | |
| *H01M 4/525* | (2010.01) | |
| *H01M 10/0525* | (2010.01) | |
| *H01M 4/02* | (2006.01) | |

(52) U.S. Cl.
CPC ............ *H01M 4/364* (2013.01); *C01G 53/50* (2013.01); *H01M 4/505* (2013.01); *H01M 4/525* (2013.01); *H01M 10/0525* (2013.01); *C01P 2002/52* (2013.01); *C01P 2004/61* (2013.01); *C01P 2006/40* (2013.01); *H01M 2004/021* (2013.01); *H01M 2004/028* (2013.01)

(58) Field of Classification Search
CPC ...... H01M 4/364; H01M 4/505; H01M 4/525; H01M 10/0525; H01M 2002/52; H01M 2004/021; H01M 2004/028; H01M 2004/61; H01M 2006/40; G01G 53/50; C01G 53/50; C01P 2004/61
See application file for complete search history.

(56) References Cited

U.S. PATENT DOCUMENTS

| | | | |
|---|---|---|---|
| 2006/0204845 A1 | 9/2006 | Chang et al. | |
| 2006/0263690 A1* | 11/2006 | Suhara | H01M 4/525 429/231.3 |
| 2011/0129734 A1 | 6/2011 | Konishi et al. | |
| 2012/0202113 A1* | 8/2012 | Hodge | H01M 4/136 429/211 |
| 2014/0087263 A1 | 3/2014 | Matsumoto et al. | |
| 2014/0242464 A1 | 8/2014 | Chang et al. | |
| 2015/0118564 A1* | 4/2015 | Shimokita | H01M 4/366 429/223 |
| 2017/0194626 A1* | 7/2017 | Yamamura | H01M 4/483 |
| 2018/0248220 A1 | 8/2018 | Manabe et al. | |

FOREIGN PATENT DOCUMENTS

| | | |
|---|---|---|
| CN | 102082269 A | 6/2011 |
| JP | 2008-532221 A | 8/2008 |
| JP | 2009-117261 A | 5/2009 |
| JP | 2011-113825 A | 6/2011 |
| JP | 2012-178295 A | 9/2012 |
| JP | 2017-117766 A | 6/2017 |
| WO | 2012/165654 A1 | 12/2012 |
| WO | 2017/038041 A1 | 3/2017 |

OTHER PUBLICATIONS

International Search Report dated Mar. 12, 2019, issued in counterpart application No. PCT/JP2018/046007 (2 pages).
English Translation of Chinese Search Report dated Jul. 22, 2022, issued in counterpart CN application No. 201880052379.7. (2 pages).

* cited by examiner

*Primary Examiner* — Brittany L Raymond
(74) *Attorney, Agent, or Firm* — WHDA, LLP

(57) ABSTRACT

The positive electrode active material with lithium composite oxide A containing W and Ni and W-free lithium composite oxide B containing Ni. Regarding the lithium composite oxide A, the proportion of Ni relative to the total moles of metal elements except for lithium is 30 to 60 mol %, 50% particle size D50 is 2 to 6 μm, 10% particle size D10 is 1.0 μm or more, and 90% particle size D90 is 6.8 μm or less. Regarding the lithium composite oxide B, the proportion of Ni relative to the total moles of metal elements except for lithium is 50 to 95 mol %, 50% particle size D50 is 10 to 22 μm, 10% particle size D10 is 7.0 μm or more, and 90% particle size D90 is 22.5 μm or less. The mass ratio of the lithium composite oxide B to the lithium composite oxide A is 1:1 to 5.7:1.

6 Claims, No Drawings

POSITIVE ELECTRODE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

TECHNICAL FIELD

The present disclosure relates to a positive electrode active material for a nonaqueous electrolyte secondary battery, a positive electrode for a nonaqueous electrolyte secondary battery, and a nonaqueous electrolyte secondary battery.

BACKGROUND ART

Nonaqueous electrolyte secondary batteries including a positive electrode, a negative electrode, and a nonaqueous electrolyte, which are charged and discharged by transfer of, for example, lithium ions between the positive electrode and the negative electrode, have been widely used as secondary batteries having high power and high energy density.

To improve battery characteristics, use of lithium composite oxides having different particle sizes or a lithium composite oxide containing an additive element, such as W, for a positive electrode active material for the positive electrode of a nonaqueous electrolyte secondary battery has been known (e.g., see PTL 1 to PTL 3).

CITATION LIST

Patent Literature

PTL 1: Japanese Published Unexamined Patent Application (Translation of PCT Application) No. 2008-532221
PTL 2: Japanese Published Unexamined Patent Application No. 2009-117261
PTL 3: Japanese Published Unexamined Patent Application No. 2011-113825

SUMMARY OF INVENTION

To obtain high-capacity and high-power nonaqueous electrolyte secondary batteries in which the amount of gas generated during charging/discharging cycles at high temperatures (e.g., 45° C. or higher) is suppressed, further study has been required.

An object of the present disclosure is to provide a positive electrode active material for a nonaqueous electrolyte secondary battery and a positive electrode for a nonaqueous electrolyte secondary battery which enable a nonaqueous electrolyte secondary battery to have high capacity and high power while suppressing the amount of gas generated during charging/discharging cycles at high temperatures, and to provide a nonaqueous electrolyte secondary battery.

A positive electrode active material for a nonaqueous electrolyte secondary battery, according to an aspect of the present disclosure, contains lithium composite oxide A containing W and Ni and W-free lithium composite oxide B containing Ni. Regarding the lithium composite oxide A, the proportion of Ni relative to the total moles of metal elements except for lithium is 30 to 60 mol %, 50% particle size D50 in a cumulative particle size distribution on a volume basis is 2 to 6 μm, 10% particle size D10 in a cumulative particle size distribution on a volume basis is 1.0 μm or more, and 90% particle size D90 in a cumulative particle size distribution on a volume basis is 6.8 μm or less. Regarding the lithium composite oxide B, the proportion of Ni relative to the total moles of metal elements except for lithium is 50 to 95 mol %, 50% particle size D50 in a cumulative particle size distribution on a volume basis is 10 to 22 μm, 10% particle size D10 in a cumulative particle size distribution on a volume basis is 7.0 μm or more, and 90% particle size D90 in a cumulative particle size distribution on a volume basis is 22.5 μm or less. The mass ratio of the lithium composite oxide B to the lithium composite oxide A is 1:1 to 5.7:1.

A positive electrode for a nonaqueous electrolyte secondary battery, according to an aspect of the present disclosure contains the positive electrode active material for a nonaqueous electrolyte secondary battery.

A nonaqueous electrolyte secondary battery according to an aspect of the present disclosure includes the positive electrode for a nonaqueous electrolyte secondary battery.

According to an aspect of the present disclosure, a nonaqueous electrolyte secondary battery can have high capacity and high power while the amount of gas generated during charging/discharging cycles at high temperatures is suppressed.

DESCRIPTION OF EMBODIMENTS

The positive electrode active material for a nonaqueous electrolyte secondary battery, according to an aspect of the present disclosure, includes lithium composite oxide A containing W and Ni and W-free lithium composite oxide B containing Ni. Regarding the lithium composite oxide A, the proportion of Ni relative to the total moles of metal elements except for lithium is 30 to 60 mol %, 50% particle size D50 in a cumulative particle size distribution on a volume basis is 2 to 6 μm, 10% particle size D10 in a cumulative particle size distribution on a volume basis is 1.0 μm or more, and 90% particle size D90 in a cumulative particle size distribution on a volume basis is 6.8 μm or less. Regarding the lithium composite oxide B, the proportion of Ni relative to the total moles of metal elements except for lithium is 50 to 95 mol %, 50% particle size D50 in a cumulative particle size distribution on a volume basis is 10 to 22 μm, 10% particle size D10 in a cumulative particle size distribution on a volume basis is 7.0 μm or more, and 90% particle size D90 in a cumulative particle size distribution on a volume basis is 22.5 μm or less. The mass ratio of the lithium composite oxide B to the lithium composite oxide A is 1:1 to 5.7:1. Such characteristics enable the secondary batteries to have high capacity and high power.

Typically, it is considered that a lithium composite oxide containing W has lower particle surface resistance than a W-free lithium composite oxide and thus, a lithium composite oxide containing W enables a battery to have higher power. However, the present inventors have diligently studied and found that such an effect of W is effectively exhibited when W is contained in a lithium composite oxide having a specific particle size (10% particle size D10, 50% particle size D50, 90% particle size D90). It is inferred that when containing W, a lithium composite oxide having a larger particle size than the above lithium composite oxide, which has the specific particle size and can thus effectively exhibit the effect of W, scarcely exhibits the effect of W, and such a larger particle size just causes mass reduction of the particles. In the positive electrode active material for a nonaqueous electrolyte secondary battery, according to an aspect of the present disclosure, lithium composite oxide A, which has a specific particle size and can thus effectively exhibit the effect of W, contains W to enable the battery to have high power. However, lithium composite oxide A, which has a specific particle size and can thus exhibit the effect of W, has a small particle size. Therefore, If the positive electrode active material contains only the lithium composite oxide A, the packing density decreases and thus, a battery cannot have sufficiently high capacity. The positive electrode active material for a nonaqueous electrolyte secondary battery, according to an aspect of the present disclosure, contains lithium composite oxide A and lithium composite oxide B, which has a larger particle size than the lithium composite oxide A, at a predetermined mass ratio. In addition, lithium composite oxide B having a larger particle size does not contain W to suppress mass reduction of the particles, and thus, the battery has high capacity. Furthermore, the combination of the lithium composite oxides A and B unexpectedly exhibits the effect of suppressing the amount of gas generated during charging/discharging cycles at high temperatures.

In the present description, 50% particle size D50 in a cumulative particle size distribution on a volume basis refers to a particle size at which the cumulative volume is 50% from smaller particle sizes. The cumulative particle size distribution on a volume basis is measured by using a laser diffraction/scattering particle size distribution analyzer under a wet condition. In the same manner, 90% particle size D90 and 10% particle size D10 in a cumulative particle size distribution on a volume basis respectively refer to a particle size at which the cumulative volume is 90% and a particle size at which the cumulative volume is 10% from smaller particle sizes. The cumulative particle size distribution on a volume basis is measured by using a laser diffraction/scattering particle size distribution analyzer under a wet condition. Such a laser diffraction/scattering particle size distribution analyzer may be LA-960, which is a laser diffraction/scattering particle size distribution analyzer manufactured by HORIBA, Ltd. Hereinafter, 50% particle size D50 in a cumulative particle size distribution on a volume basis is referred to as 50% particle size D50, 90% particle size D90 in a cumulative particle size distribution on a volume basis is referred to as 90% particle size D90, and 10% particle size D10 in a cumulative particle size distribution on a volume basis is referred to as 10% particle size D10.

Hereinafter, an exemplary nonaqueous electrolyte secondary battery according to an aspect of the present disclosure will be described.

An exemplary nonaqueous electrolyte secondary battery according to an embodiment includes a positive electrode, a negative electrode, and a nonaqueous electrolyte. A separator is preferably disposed between the positive electrode and the negative electrode. Specifically, the battery has a structure in which a wound-type electrode body formed of the positive electrode and the negative electrode wound together with the separator disposed therebetween and the nonaqueous electrolyte are accommodated in an outer body. The electrode body is not limited to a wound-type electrode body and may be another type of electrode body, such as a stacked-type electrode body formed of a positive electrode and a negative electrode stacked on each other with a separator disposed therebetween. The type of nonaqueous electrolyte secondary battery is not particularly limited and may be a cylindrical type, a prismatic type, a coin type, a button type, or a laminate type.

[Positive Electrode]

The positive electrode includes a positive electrode current collector that may be made of a metal foil and a positive electrode mixture layer formed on such a positive electrode current collector. For the positive electrode current collector, a foil of a metal that is stable within the positive electrode potential range, such as aluminum, or, for example, a film having a surface on which such a metal is disposed may be used.

The positive electrode mixture layer contains a positive electrode active material. The positive electrode mixture layer preferably contains a conductive material and a binder in addition to the positive electrode active material. The positive electrode mixture layer may have a thickness of 10 µm or more.

The positive electrode can be produced by, for example, preparing a positive electrode mixture slurry containing a positive electrode active material, a conductive material, and a binder, applying the positive electrode mixture slurry to a positive electrode current collector, drying the positive electrode mixture slurry to form a positive electrode mixture layer, and pressure molding the positive electrode mixture layer.

The positive electrode active material contains lithium composite oxide A containing W and Ni and W-free lithium composite oxide B containing Ni.

Regarding lithium composite oxide A containing W and Ni, the proportion of Ni relative to the total moles of metal elements except for lithium is 30 to 60 mol %, 50% particle size D50 is 2 to 6 µm, 10% particle size D10 is 1.0 µm or more, and 90% particle size D90 is 6.8 µm or less.

Regarding lithium composite oxide A containing W and Ni, the proportion of Ni relative to the total moles of metal elements except for lithium is 30 to 60 mol %. To improve, for example, the battery capacity, battery power, or charging/discharging cycle characteristics, 35 to 55 mol % is preferable. Regarding lithium composite oxide A, if the proportion of Ni relative to the total moles of metal elements except for lithium is less than 30 mol % or more than 60 mol %, a decrease in diffusivity of lithium or destabilization of the crystal structure may occur and thus, battery capacity, battery power, or charging/discharging cycle characteristics may decrease.

Regarding lithium composite oxide A containing W and Ni, 50% particle size D50 is 2 to 6 µm, 10% particle size D10 is 1.0 µm or more, and 90% particle size D90 is 6.8 µm or less. To improve, for example, battery power, it is preferable that 50% particle size D50 be 2.5 to 4.5 µm, that 10% particle size D10 be 1.5 to 2.5 µm, and that 90% particle size D90 be 4.5 to 6.0 µm. Regarding lithium composite oxide A, if 50% particle size D50, 10% particle size D10, and 90% particle size D90 do not satisfy the above respective ranges, the effect of W (decrease in particle surface resistance) is scarcely exhibited when W is contained, compared with a case in which D50, D10, and D90 satisfy the above respective ranges, and thus, the battery power decreases.

The proportion of W relative to the total moles of metal elements except for lithium is preferably 0.2 to 0.6 mol % in lithium composite oxide A, in order to improve, for example, battery capacity and battery power.

Lithium composite oxide A may contain another element in addition to tungsten (W), nickel (Ni), and lithium (Li). Examples of such an element include cobalt (Co), manganese (Mn), zirconium (Zr), niobium (Nb), molybdenum (Mo), phosphorus (P), sulfur (S), magnesium (Mg), aluminum (Al), calcium (Ca), scandium (Sc), titanium (Ti), vanadium (V), chromium (Cr), iron (Fe), copper (Cu), zinc (Zn), gallium (Ga), germanium (Ge), yttrium (Y), tin (Sn), antimony (Sb), lead (Pb), and bismuth (Bi). Among such elements, for example, to suppress the amount of gas generated during charging/discharging cycles at high temperatures or to suppress a decrease in charging/discharging cycle characteristics, lithium composite oxide A preferably contains Zr and more preferably Zr, Co, and Mn.

The proportion of Zr relative to the total moles of metal elements except for lithium is preferably 0.1 to 0.7 mol % in lithium composite oxide A, in order to suppress the amount of gas generated during charging/discharging cycles at high temperatures or to suppress a decrease in charging/discharging cycle characteristics, for example. The proportions of Co and Mn relative to the total moles of metal elements except for lithium are each preferably 15 to 35 mol % in lithium composite oxide A, in order to suppress the amount of gas generated during charging/discharging cycles at high temperatures or to suppress a decrease in charging/discharging cycle characteristics, for example.

Lithium composite oxide A preferably has a BET specific surface area of, for example, 1.20 to 1.70 m$^2$/g. When the BET specific surface area of lithium composite oxide A satisfies the above range, the reactivity of the particle surface increases, compared with a case in which the BET specific surface area of lithium composite oxide A does not satisfy the above range, and thus, the battery power may further improve. The BET specific surface area is measured in conformity with the BET method (nitrogen adsorption method) described in JIS R1626.

Lithium composite oxide A can be obtained by mixing, for example, an oxide containing Ni, a lithium compound, and a tungsten compound with each other and firing the mixture. The mixing ratio of the above materials is determined such that the proportion of Ni relative to the total moles of metal elements except for lithium is 30 to 60 mol % in the lithium composite oxide containing Ni and W, which is finally obtained. The particle size of lithium composite oxide A (50% particle size D50, 10% particle size D10, 90% particle size D90) is adjusted by, for example, adjusting the particle size of the precursor used to obtain the oxide containing Ni, adjusting the firing temperature and time of the mixture, or performing pulverizing. To readily adjust the particle size of lithium composite oxide A within the above-defined range, the following conditions are preferable. Regarding the particle size of the precursor, for example, it is preferable that 50% particle size D50 be 3 to 5 μm, that 10% particle size D10 be 2 to 3 μm, and that 90% particle size D90 be 6 to 7 μm. The firing temperature is preferably, for example, 850° C. to 900° C., and the firing time is preferably, for example, 15 hours or longer.

Regarding W-free lithium composite oxide B containing Ni, the proportion of Ni relative to the total moles of metal elements except for lithium is 50 to 95 mol %, 50% particle size D50 is 10 to 22 μm, 10% particle size D10 is 7.0 μm or more, and 90% particle size D90 is 22.5 μm or less.

Regarding W-free lithium composite oxide B containing Ni, the proportion of Ni relative to the total moles of metal elements except for lithium is 50 to 95 mol %. To improve, for example, battery capacity, battery power, and charging/discharging cycle characteristics, 55 to 88 mol % is preferable. Regarding lithium composite oxide B, if the proportion of Ni relative to the total moles of metal elements except for lithium is less than 50 mol % or more than 95 mol %, a decrease in diffusivity of lithium or destabilization of the crystal structure may occur and thus, battery capacity, battery power, or charging/discharging cycle characteristics may decrease.

Regarding W-free lithium composite oxide B containing Ni, 50% particle size D50 is 10 to 22 μm, 10% particle size D10 is 7.0 μm or more, and 90% particle size D90 is 22.5 μm or less. To improve, for example, battery capacity, it is preferable that 50% particle size D50 be 11.0 to 20.5 μm, that 10% particle size D10 be 7.0 to 10.5 μm, and that 90% particle size D90 be 21.0 to 22.5 μm. Regarding the lithium composite oxide B, if neither 50% particle size D50, 10% particle size D10, nor 90% particle size D90 satisfies the above corresponding range, packing density decreases, and the battery capacity decreases, compared with a case in which D50, D10, and D90 satisfy the above respective ranges.

Lithium composite oxide B may contain another element in addition to nickel (Ni) and lithium (Li). Examples of such an element does not include tungsten (W) and include cobalt (Co), manganese (Mn), zirconium (Zr), niobium (Nb), molybdenum (Mo), phosphorus (P), sulfur (S), magnesium (Mg), aluminum (Al), calcium (Ca), scandium (Sc), titanium (Ti), vanadium (V), chromium (Cr), iron (Fe), copper (Cu), zinc (Zn), gallium (Ga), germanium (Ge), yttrium (Y), tin (Sn), antimony (Sb), lead (Pb), and bismuth (Bi). Among such elements, to suppress the amount of gas generated during charging/discharging cycles at high temperatures or to suppress a decrease in charging/discharging cycle characteristics, lithium composite oxide B preferably contains Zr and more preferably Zr, Co, and Mn.

The proportion of Zr relative to the total moles of metal elements except for lithium is preferably 0.1 to 0.7 mol % in lithium composite oxide B, in order to suppress the amount of gas generated during charging/discharging cycles at high temperatures or to suppress a decrease in charging/discharging cycle characteristics, for example. The proportions of Co and Mn relative to the total moles of metal elements except for lithium are each preferably 5 to 30 mol % in lithium composite oxide B, in order to suppress the amount of gas generated during charging/discharging cycles at high temperatures or to suppress a decrease in charging/discharging cycle characteristics, for example.

Lithium composite oxide B preferably has a BET specific surface area of, for example, 0.1 to 0.4 m$^2$/g. When the BET specific surface area of lithium composite oxide B satisfies the above range, for example, packing density increases, compared with a case in which the BET specific surface area of lithium composite oxide B does not satisfy the above range, and thus, the battery capacity may further improve.

Lithium composite oxide B can be obtained by mixing, for example, an oxide containing Ni and a lithium compound with each other and firing the mixture. The mixing ratio of the above materials is determined such that the proportion of Ni relative to the total moles of metal elements except for lithium is 50 to 95 mol % in the W-free lithium composite oxide containing Ni, which is finally obtained. The particle size of lithium composite oxide B (50% particle size D50, 10% particle size D10, 90% particle size D90) is adjusted by, for example, adjusting the particle size of the precursor used to obtain the oxide containing Ni, adjusting the firing temperature and time of the mixture, or performing pulverizing. To readily adjust the particle size of lithium composite oxide B within the above-defined range, the following conditions are preferable. Regarding the particle size of the precursor, for example, it is preferable that 50% particle size D50 be 12 to 23 μm, that 10% particle size D10 be 8 to 11 μm, and that 90% particle size D90 be 24 to 27 μm. The firing temperature is preferably, for example, 850° C. to 900° C., and the firing time is preferably, for example, 20 hours or longer.

The mass ratio of lithium composite oxide B to lithium composite oxide A is 1:1 to 5.7:1. To improve, for example, packing density and battery capacity, the mass ratio is preferably 2.0:1 to 4.5:1.

The amount of lithium composite oxide A and lithium composite oxide B in the positive electrode active material is preferably, for example, 50 mass % or more and more preferably 80 mass % or more.

The positive electrode active material may contain another lithium composite oxide having a composition and a particle size that are different from those of lithium composite oxide A and lithium composite oxide B.

The conductive material may be a carbon material, such as carbon black, acetylene black, KETJENBLACK, or graphite. Such materials may be used alone or in a combination of two or more.

Examples of the binder include fluororesins, such as polytetrafluoroethylene (PTFE) and polyvinylidene fluoride (PVdF), polyacrylonitrile (PAN), polyimides, acrylic resins, and polyolefins. Such resins may be used with, for example, carboxymethyl cellulose (CMC) or a salt thereof, or a polyethylene oxide (PEO). Such compounds may be used alone or in a combination of two or more.

[Negative Electrode]

The negative electrode includes a negative electrode current collector that may be made of a metal foil and a negative electrode mixture layer formed on such a current collector. For the negative electrode current collector, a foil of a metal that is stable within the negative electrode potential range, such as copper, or a film having a surface on which such a metal is disposed may be used. The negative electrode mixture layer contains a negative electrode active material and a binder. The negative electrode can be produced by, for example, preparing a negative electrode mixture slurry containing materials, such as a negative electrode active material and a binder, applying the negative electrode mixture slurry to a negative electrode current collector, drying the negative electrode mixture slurry to form a negative electrode mixture layer, and pressure molding the negative electrode mixture layer.

The negative electrode active material may be any material that can bind and release lithium ions reversibly. Examples of such a material include carbon materials, such as natural graphite and synthetic graphite, metals that can be alloyed with lithium, such as silicon (Si) and tin (Sn), and alloys and composite oxides that contain a metal element, such as Si or Sn. Such negative electrode active materials may be used alone or in a combination of two or more.

Examples of the binder include fluororesins, PAN, polyimides, acrylic resins, and polyolefins, in the same manner as those in the positive electrode. When a mixture slurry is prepared using an aqueous solvent, a compound, such as CMC or a salt thereof, stylene-butadiene rubber (SBR), polyacrylic acid (PAA) or a salt thereof, or polyvinyl alcohol (PVA), is preferably used.

[Separator]

For the separator, a porous sheet having ion permeability and insulating properties may be used. Specific examples of the porous sheet include microporous thin films, woven fabrics, and nonwoven fabrics. The separator is formed of, for example, polyolefin, such as polyethylene or polypropylene, or cellulose. The separator may be a multilayer body including a cellulose fiber layer and a thermoplastic resin fiber layer, such as a polyolefin fiber layer. The separator may be a multilayer separator including a polyethylene layer and a polypropylene layer and may have a surface layer formed of an aramid resin or a surface layer containing an inorganic filler.

[Nonaqueous Electrolyte]

The nonaqueous electrolyte contains a nonaqueous solvent and a solute (electrolyte salt) dissolved in the nonaqueous solvent. Examples of the nonaqueous solvent include esters, ethers, nitriles, amides, such as dimethylformamide, isocyanates, such as hexamethylene diisocyanate, and mixture solvents of two or more of the above compounds. The nonaqueous solvent may contain a halogen-substituted derivative in which hydrogens of such a solvent are at least partially substituted with halogen atoms, such as fluorine.

Examples of the above esters include cyclic carbonate esters, such as ethylene carbonate (EC), propylene carbonate (PC), and butylene carbonate, linear carbonate esters, such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylic acid esters, such as γ-butyrolactone and γ-valerolactone, and linear carboxylic acid esters, such as methyl acetate, ethyl acetate, propyl acetate, methyl propionate (MP), and ethyl propionate.

Examples of the above ethers include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and linear ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the above nitriles include acetonitrile, propionitrile, butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile.

Examples of the above halogen-substituted derivative include fluorinated cyclic carbonate esters, such as fluoroethylene carbonate (FEC), fluorinated linear carbonate esters, and fluorinated linear carboxylic acid esters, such as fluoromethyl propionate (FMP).

Examples of the electrolyte salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n-1})_x$ (1<x<6, n equals 1 or 2), $LiB_{10}Cl_{10}$, LiCl, LiBr, LiI, chloroborane lithium, lithium lower aliphatic carboxylate, boric acid salts, such as $Li_2B_4O_7$ and $Li(B(C_2O_4)F_2)$, and imide salts, such as $LiN(SO_2CF_3)_2$ and $LiN(C_lF_{2l+1}SO_2)$ $(C_mF_{2m+1}SO_2)$ {l and m are each an integer of 0 or higher}. Such electrolyte salts may be used alone or in a combination of two or more. The concentration of the electrolyte salt may be 0.8 to 1.8 mol per liter of the nonaqueous solvent.

EXAMPLES

Hereinafter, with reference to Examples, the present disclosure will be further described. The present disclosure is not limited to such Examples.

Example 1

[Production of Lithium Composite Oxide A]

A transition metal precursor represented by $Ni_{0.35}Co_{0.30}Mn_{0.35}(OH)_2$ obtained by a coprecipitation method was fired at 350° C. for 12 hours to obtain a composite oxide containing Ni, Co, and Mn. The composite oxide containing Ni, Co and Mn, a tungsten salt, a zirconium salt, and LiOH were mixed together such that the molar ratio of Li/total amount of Ni, Co and Mn/W/Zr was 1.11:1.00: 0.005:0.005. The mixture was fired at 875° C. for 15 hours in an oxygen atmosphere to produce lithium composite oxide A containing Ni, Co, Mn, W, and Zr.

Regarding lithium composite oxide A, the proportion of Ni was 35 mol %, the proportion of Zr was 0.5 mol %, the proportion of W was 0.5 mol %, 50% particle size D50 was 4.2 µm, 10% particle size D10 was 2.3 µm, and 90% particle size D90 was 5.8 µm or less.

[Production of Lithium Composite Oxide B]

A transition metal precursor represented by $Ni_{0.55}Co_{0.20}Mn_{0.25}(OH)_2$ obtained by a coprecipitation method was fired at 350° C. for 9 hours to obtain a composite oxide containing Ni, Co, and Mn. The composite oxide containing Ni, Co and Mn, LiOH, and a zirconium salt were mixed together such that the molar ratio of Li/total amount of Ni, Co and Mn/Zr was 1.08:1.00:0.005. The mixture was fired at 900° C. for 20 hours in an oxygen atmosphere to produce W-free lithium composite oxide B containing Ni, Co, Mn, and Zr.

Regarding lithium composite oxide B, the proportion of Ni was 55 mol %, the proportion of Zr was 0.5 mol %, 50% particle size D50 was 12.1 µm, 10% particle size D10 was 7.3 µm, and 90% particle size D90 was 21.2 µm or less.

[Production of Positive Electrode]

W-free lithium composite oxide B containing Ni, Co, Mn, and Zr and lithium composite oxide A containing Ni, Co, Mn, W, and Zr were mixed together at a mass ratio of 7:3. The mixture was used as the positive electrode active material. Then, mixing was performed such that the resultant mixture contained 95.8 mass % of the positive electrode active material, 3 mass % of carbon powder, and 1.2 mass % of polyvinylidene fluoride powder serving as the binder. Thereafter, an appropriate amount of N-methyl-2-pyrrolidon was added to the mixture to prepare a positive electrode mixture slurry. Next, the positive electrode mixture slurry was applied by a doctor blade method to each surface of a positive electrode current collector made of an aluminum foil, dried, and thereafter, rolled by using a roller at a pressure of 500 MPa to produce a positive electrode including a positive electrode active material layer formed on each surface of the positive electrode current collector. A portion on which the positive electrode active material layer was not formed was provided in the center area of the positive electrode current collector in the longitudinal direction. A positive electrode tab was attached to such a portion. The thickness of the positive electrode mixture layer was about 140 µm. The total thickness of the positive electrode current collector and the positive electrode mixture layers on both surfaces of the positive electrode current collector was about 300 µm.

[Production of Negative Electrode]

Mixing was performed such that the resultant mixture contained 98.2 mass % of graphite serving as the negative electrode active material, 0.7 mass % of styrene-butadiene rubber, and 1.1 mass % of sodium carboxymethyl cellulose. Thereafter, an appropriate amount of water was added to the mixture to prepare a negative electrode mixture slurry. Next, the negative electrode mixture slurry was applied by a doctor blade method to each surface of a negative electrode current collector made of a copper foil, dried, and thereafter, rolled by using a roller to produce a negative electrode including a negative electrode active material layer formed on each surface of the negative electrode current collector. A portion on which the mixture layer was not formed was provided at each end of the negative electrode current collector in the longitudinal direction. A negative electrode tab was attached to each portion. The thickness of the negative electrode mixture layer was about 120 µm. The total thickness of the negative electrode current collector and the negative electrode mixture layers on both surfaces of the negative electrode current collector was about 250 µm.

[Preparation of Nonaqueous Electrolyte Solution]

In a nonaqueous solvent in which equal volumes of ethylene carbonate (EC) and diethyl carbonate (DEC) were mixed together, lithium hexafluorophosphate ($LiPF_6$) was dissolved at a concentration of 1.6 mol/L to prepare a nonaqueous electrolyte.

[Production of Battery]

A nonaqueous electrolyte secondary battery was produced by using the positive electrode, the negative electrode, the nonaqueous electrolyte solution, and a separator in accordance with the following procedure. (1) The positive electrode and the negative electrode were wound together with a separator disposed therebetween to produce an electrode body having a winding structure. (2) An insulating plate was disposed at each of the upper and lower ends of the electrode body. The wound electrode body was accommodated in a cylindrical battery outer can with a diameter of 18 mm and a height of 65 mm. (3) The current collector tab of the negative electrode was welded to the inner surface of the bottom portion of the battery outer can, and the current collector tab of the positive electrode was welded to the bottom plate of the sealing body. (4) A nonaqueous electrolyte solution was poured from the opening of the battery outer can, and thereafter, the battery outer can was sealed with the sealing body.

Example 2

A nonaqueous electrolyte secondary battery was produced in the same manner as that in Example 1, except that W-free lithium composite oxide B containing Ni, Co, Mn, and Zr in Example 1 and lithium composite oxide A containing Ni, Co, Mn, W, and Zr in Example 1 were mixed together at a mass ratio of 8:2 and that the mixture was used as the positive electrode active material.

Example 3

A nonaqueous electrolyte secondary battery was produced in the same manner as that in Example 1, except that W-free lithium composite oxide B containing Ni, Co, Mn, and Zr in Example 1 and lithium composite oxide A containing Ni, Co, Mn, W, and Zr in Example 1 were mixed together at a mass ratio of 5:5 and that the mixture was used as the positive electrode active material.

Example 4

W-free lithium composite oxide B containing Ni, Co, Mn, and Zr was produced under the same conditions as that in Example 1, except that the precursor in Example 1 was changed to a precursor having a larger particle size in the production of the lithium composite oxide B. Regarding such a lithium composite oxide B, the proportion of Ni was 55 mol %, the proportion of Zr was 0.5 mol %, 50% particle size D50 was 17.0 µm, 10% particle size D10 was 8.6 µm, and 90% particle size D90 was 21.7 µm or less.

A nonaqueous electrolyte secondary battery was produced in the same manner as that in Example 1, except that the above-produced W-free lithium composite oxide B containing Ni, Co, Mn, and Zr and lithium composite oxide A containing Ni, Co, Mn, W, and Zr in Example 1 were mixed together at a mass ratio of 7:3 and that the mixture was used as the positive electrode active material.

Example 5

W-free lithium composite oxide B containing Ni, Co, Mn, and Zr was produced under the same conditions as that in Example 1, except that the precursor in Example 1 was changed to a precursor having a larger particle size than the precursor in Example 4 in the production of lithium composite oxide B. Regarding such a lithium composite oxide B, the proportion of Ni was 55 mol %, the proportion of Zr was 0.5 mol %, 50% particle size D50 was 21.0 µm, 10% particle size D10 was 10.2 µm, and 90% particle size D90 was 22.4 µm or less.

A nonaqueous electrolyte secondary battery was produced in the same manner as that in Example 1, except that the above-produced W-free lithium composite oxide B containing Ni, Co, Mn, and Zr and lithium composite oxide A containing Ni, Co, Mn, W, and Zr in Example 1 were mixed together at a mass ratio of 7:3 and that the mixture was used as the positive electrode active material.

Example 6

W-free lithium composite oxide B containing Ni, Co, Mn, and Zr was produced under the same conditions as that in Example 1, except that the precursor in Example 1 was changed to a precursor having a smaller particle size in the production of lithium composite oxide B. Regarding such a lithium composite oxide B, the proportion of Ni was 55 mol %, the proportion of Zr was 0.5 mol %, 50% particle size D50 was 10.0 µm, 10% particle size D10 was 7.0 µm, and 90% particle size D90 was 20.9 µm or less.

A nonaqueous electrolyte secondary battery was produced in the same manner as that in Example 1, except that the above-produced W-free lithium composite oxide B containing Ni, Co, Mn, and Zr and lithium composite oxide A containing Ni, Co, Mn, W, and Zr in Example 1 were mixed together at a mass ratio of 7:3 and that the mixture was used as the positive electrode active material.

Example 7

Lithium composite oxide A containing Ni, Co, Mn, W, and Zr was produced under the same conditions as that in Example 1, except that the precursor in Example 1 was changed to a precursor having a larger particle size in the production of lithium composite oxide A. Regarding such a lithium composite oxide A, the proportion of Ni was 35 mol %, the proportion of Zr was 0.5 mol %, the proportion of W was 0.5 mol %, 50% particle size D50 was 5.9 µm, 10% particle size D10 was 2.7 µm, and 90% particle size D90 was 6.8 µm or less.

A nonaqueous electrolyte secondary battery was produced in the same manner as that in Example 1, except that W-free lithium composite oxide B containing Ni, Co, Mn, and Zr in Example 1 and the above-produced lithium composite oxide A containing Ni, Co, Mn, W, and Zr were mixed together at a mass ratio of 7:3 and that the mixture was used as the positive electrode active material.

Example 8

Lithium composite oxide A containing Ni, Co, Mn, W, and Zr was produced under the same conditions as that in Example 1, except that the precursor in Example 1 was changed to a precursor having a smaller particle size in the production of lithium composite oxide A. Regarding such a lithium composite oxide A, the proportion of Ni was 35 mol %, the proportion of Zr was 0.5 mol %, the proportion of W was 0.5 mol %, 50% particle size D50 was 2.7 µm, 10% particle size D10 was 1.3 µm, and 90% particle size D90 was 4.4 µm or less.

A nonaqueous electrolyte secondary battery was produced in the same manner as that in Example 1, except that W-free lithium composite oxide B containing Ni, Co, Mn, and Zr in Example 1 and the above-produced lithium composite oxide A containing Ni, Co, Mn, W, and Zr were mixed together at a mass ratio of 7:3 and that the mixture was used as the positive electrode active material.

Example 9

W-free lithium composite oxide B containing Ni, Co, Mn, and Zr was produced under the same conditions as that in Example 1, except that the amount of Zr added in Example 1 was changed to 0.3 mol % in the production of lithium composite oxide B. Regarding such a lithium composite oxide B, the proportion of Ni was 55 mol %, the proportion of Zr was 0.3 mol %, 50% particle size D50 was 12.2 µm, 10% particle size D10 was 7.5 µm, and 90% particle size D90 was 21.3 µm or less.

A nonaqueous electrolyte secondary battery was produced in the same manner as that in Example 1, except that the above-produced W-free lithium composite oxide B containing Ni, Co, Mn, and Zr and lithium composite oxide A containing Ni, Co, Mn, W, and Zr in Example 1 were mixed together at a mass ratio of 7:3 and that the mixture was used as the positive electrode active material.

Example 10

Lithium composite oxide A containing Ni, Co, Mn, W, and Zr was produced under the same conditions as that in Example 1, except that the amount of Zr added in Example 1 was changed to 0.3 mol % in the production of lithium composite oxide A. Regarding such a lithium composite oxide A, the proportion of Ni was 35 mol %, the proportion of Zr was 0.3 mol %, the proportion of W was 0.5 mol %, 50% particle size D50 was 4.0 µm, 10% particle size D10 was 2.0 µm, and 90% particle size D90 was 5.6 µm or less.

A nonaqueous electrolyte secondary battery was produced in the same manner as that in Example 1, except that W-free lithium composite oxide B containing Ni, Co, Mn, and Zr in Example 1 and the above-produced lithium composite oxide A containing Ni, Co, Mn, W, and Zr were mixed together at a mass ratio of 7:3 and that the mixture was used as the positive electrode active material.

Example 11

Lithium composite oxide A containing Ni, Co, Mn, W, and Zr was produced under the same conditions as that in Example 1, except that the amount of W added in Example 1 was changed to 0.3 mol % in the production of lithium composite oxide A. Regarding such a lithium composite oxide A, the proportion of Ni was 35 mol %, the proportion of Zr was 0.5 mol %, the proportion of W was 0.3 mol %, 50% particle size D50 was 3.9 µm, 10% particle size D10 was 1.9 µm, and 90% particle size D90 was 5.6 µm or less.

A nonaqueous electrolyte secondary battery was produced in the same manner as that in Example 1, except that W-free lithium composite oxide B containing Ni, Co, Mn, and Zr in Example 1 and the above-produced lithium composite oxide A containing Ni, Co, Mn, W, and Zr were mixed together at a mass ratio of 7:3 and that the mixture was used as the positive electrode active material.

Example 12

W-free and Zr-free Lithium composite oxide B containing Ni, Co, and Mn was produced under the same conditions as that in Example 1, except that the composite oxide containing Ni, Co, and Mn and LiOH were mixed together such that the molar ratio of Li to the total amount of Ni, Co, and Mn was 1.10:1.00 in the production of lithium composite oxide B. Regarding lithium composite oxide B, the proportion of Ni and the particle size were the same as those in Example 1.

A nonaqueous electrolyte secondary battery was produced in the same manner as that in Example 1, except that the above-produced W-free and Zr-free lithium composite oxide B containing Ni, Co, and Mn and lithium composite oxide A containing Ni, Co, Mn, W, and Zr in Example 1 were mixed together at a mass ratio of 7:3 and that the mixture was used as the positive electrode active material.

Example 13

Zr-free lithium composite oxide A containing Ni, Co, Mn, and W was produced under the same conditions as that in Example 1, except that the composite oxide containing Ni, Co and Mn, LiOH, and the tungsten salt were mixed together such that the molar ratio of Li/total amount of Ni, Co and Mn/W was 1.07:1.00:0.005 in the production of lithium composite oxide A. Regarding lithium composite oxide A, the proportion of Ni and the particle size were the same as those in Example 1.

A nonaqueous electrolyte secondary battery was produced in the same manner as that in Example 1, except that W-free and Zr-free lithium composite oxide B containing Ni, Co, and Mn in Example 12 and the above-produced Zr-free lithium composite oxide A containing Ni, Co, Mn, and W were mixed together at a mass ratio of 7:3 and that the mixture was used as the positive electrode active material.

Example 14

Zr-free lithium composite oxide A containing Ni, Co, Mn, and W was produced under the same conditions as that in Example 1, except that the composite oxide containing Ni, Co and Mn, the tungsten salt, and LiOH were mixed together such that the molar ratio of Li/total amount of Ni, Co and Mn/W was 1.07:1.00:0.005 in the production of lithium composite oxide A. Regarding such a lithium composite oxide A, the proportion of Ni was 55 mol %, the proportion of W was 0.5 mol %, 50% particle size D50 was 4.1 µm, 10% particle size D10 was 2.3 µm, and 90% particle size D90 was 5.7 µm or less.

A nonaqueous electrolyte secondary battery was produced in the same manner as that in Example 1, except that W-free lithium composite oxide B containing Ni, Co, Mn, and Zr in Example 1 and the above-produced Zr-free lithium composite oxide A containing Ni, Co, Mn, and W were mixed together at a mass ratio of 7:3 and that the mixture was used as the positive electrode active material.

Comparative Example 1

Lithium composite oxide B containing Ni, Co, Mn, W, and Zr was produced under the same conditions as that in Example 1, except that the composite oxide containing Ni, Co, and Mn, the tungsten salt, the zirconium salt, and LiOH were mixed together such that the molar ratio of Li/total amount of Ni, Co, and Mn/W/Zr was 1.08:1.00:0.005:0.005 in the production of lithium composite oxide B. Regarding such a lithium composite oxide B, the proportion of Ni was 55 mol %, the proportion of W was 0.5 mol %, the proportion of Zr was 0.3 mol %, 50% particle size D50 was 11.9 µm, 10% particle size D10 was 7.4 µm, and 90% particle size D90 was 21.1 µm or less.

A nonaqueous electrolyte secondary battery was produced in the same manner as that in Example 1, except that the above-produced lithium composite oxide B containing Ni, Co, Mn, W, and Zr and lithium composite oxide A containing Ni, Co, Mn, W, and Zr in Example 1 were mixed together at a mass ratio of 7:3 and that the mixture was used as the positive electrode active material.

Comparative Example 2

A nonaqueous electrolyte secondary battery was produced in the same manner as that in Example 1, except that lithium composite oxide B containing Ni, Co, Mn, W, and Zr in Comparative Example 1 and lithium composite oxide A containing Ni, Co, Mn, W, and Zr in Example 1 were mixed together at a mass ratio of 9:1 and that the mixture was used as the positive electrode active material.

Comparative Example 3

A nonaqueous electrolyte secondary battery was produced in the same manner as that in Example 1, except that lithium composite oxide B containing Ni, Co, Mn, W, and Zr in Comparative Example 1 and lithium composite oxide A containing Ni, Co, Mn, W, and Zr in Example 1 were mixed together at a mass ratio of 4:6 and that the mixture was used as the positive electrode active material.

Comparative Example 4

W-free lithium composite oxide B containing Ni, Co, Mn, and Zr was produced under the same conditions as that in Example 1, except that the precursor in Example 1 was changed to a precursor having a larger particle size in the production of the lithium composite oxide B. Regarding such a lithium composite oxide B, the proportion of Ni was 55 mol %, the proportion of Zr was 0.5 mol %, 50% particle size D50 was 25.3 µm, 10% particle size D10 was 12.0 µm, and 90% particle size D90 was 29.3 µm or less.

A nonaqueous electrolyte secondary battery was produced in the same manner as that in Example 1, except that the above-produced W-free lithium composite oxide B containing Ni, Co, Mn, and Zr and lithium composite oxide A containing Ni, Co, Mn, W, and Zr in Example 1 were mixed together at a mass ratio of 7:3 and that the mixture was used as the positive electrode active material.

Comparative Example 5

W-free lithium composite oxide B containing Ni, Co, Mn, and Zr was produced under the same conditions as that in Example 1, except that the precursor in Example 1 was changed to a precursor having a smaller particle size in the production of lithium composite oxide B. Regarding such a lithium composite oxide B, the proportion of Ni was 55 mol %, the proportion of Zr was 0.5 mol %, 50% particle size D50 was 7.0 µm, 10% particle size D10 was 5.1 µm, and 90% particle size D90 was 10.2 µm or less.

A nonaqueous electrolyte secondary battery was produced in the same manner as that in Example 1, except that the above-produced W-free lithium composite oxide B containing Ni, Co, Mn, and Zr and lithium composite oxide A containing Ni, Co, Mn, W, and Zr in Example 1 were mixed together at a mass ratio of 7:3 and that the mixture was used as the positive electrode active material.

Comparative Example 6

Lithium composite oxide A containing Ni, Co, Mn, W, and Zr was produced under the same conditions as that in Example 1, except that the precursor in Example 1 was changed to a precursor having a larger particle size in the production of lithium composite oxide A. Regarding such a lithium composite oxide A, the proportion of Ni was 35 mol %, the proportion of W was 0.5 mol %, the proportion of Zr was 0.5 mol %, 50% particle size D50 was 7.0 µm, 10% particle size D10 was 4.9 µm, and 90% particle size D90 was 9.9 µm or less.

A nonaqueous electrolyte secondary battery was produced in the same manner as that in Example 1, except that W-free lithium composite oxide B containing Ni, Co, Mn, and Zr in Example 1 and the above-produced lithium composite oxide A containing Ni, Co, Mn, W, and Zr were mixed together at a mass ratio of 7:3 and that the mixture was used as the positive electrode active material.

Comparative Example 7

Lithium composite oxide A containing Ni, Co, Mn, W, and Zr was produced under the same conditions as that in Example 1, except that the precursor in Example 1 was changed to a precursor having a smaller particle size in the production of lithium composite oxide A. Regarding such a lithium composite oxide A, the proportion of Ni was 35 mol %, the proportion of W was 0.5 mol %, the proportion of Zr was 0.5 mol %, 50% particle size D50 was 1.5 µm, 10% particle size D10 was 0.3 µm, and 90% particle size D90 was 2.6 µm or less.

A nonaqueous electrolyte secondary battery was produced in the same manner as that in Example 1, except that W-free lithium composite oxide B containing Ni, Co, Mn, and Zr in Example 1 and the above-produced lithium composite oxide A containing Ni, Co, Mn, W, and Zr were mixed together at a mass ratio of 7:3 and that the mixture was used as the positive electrode active material.

Comparative Example 8

Zr-free lithium composite oxide A containing Ni, Co, Mn, and W was produced under the same conditions as that in Example 1, except that the composite oxide containing Ni, Co and Mn, the tungsten salt, and LiOH were mixed together such that the molar ratio of Li/total amount of Ni, Co and Mn/W was 1.11:1.00:0.005 in the production of lithium composite oxide A. Regarding such a lithium composite oxide A, the proportion of Ni was 35 mol %, the proportion of W was 0.5 mol %, 50% particle size D50 was 4.0 µm, 10% particle size D10 was 2.2 µm, and 90% particle size D90 was 5.6 µm or less.

A nonaqueous electrolyte secondary battery was produced in the same manner as that in Example 1, except that lithium composite oxide B containing Ni, Co, Mn, W, and Zr in Comparative Example 1 and the above-produced Zr-free lithium composite oxide A containing Ni, Co, Mn, and W were mixed together at a mass ratio of 7:3 and that the mixture was used as the positive electrode active material.

Comparative Example 9

W-free lithium composite oxide A containing Ni, Co, Mn, and Zr was produced under the same conditions as that in Example 1, except that the composite oxide containing Ni, Co, and Mn, the zirconium salt, and LiOH were mixed together such that the molar ratio of Li/total amount of Ni, Co, and Mn/Zr was 1.11:1.00:0.005 in the production of lithium composite oxide A. Regarding such a lithium composite oxide A, the proportion of Ni was 35 mol %, the proportion of Zr was 0.5 mol %, 50% particle size D50 was 4.3 µm, 10% particle size D10 was 2.3 µm, and 90% particle size D90 was 5.9 µm or less.

A nonaqueous electrolyte secondary battery was produced in the same manner as that in Example 1, except that lithium composite oxide B containing Ni, Co, Mn, W, and Zr in Comparative Example 1 and the above-produced W-free lithium composite oxide A containing Ni, Co, Mn, and Zr were mixed together at a mass ratio of 7:3 and that the mixture was used as the positive electrode active material.

Comparative Example 10

Zr-free lithium composite oxide B containing Ni, Co, Mn, and W was produced under the same conditions as that in Example 1, except that the composite oxide containing Ni, Co, and Mn, the tungsten salt, and LiOH were mixed together such that the molar ratio of Li/total amount of Ni, Co, and Mn/W was 1.08:1.00:0.005 in the production of lithium composite oxide B. Regarding such a lithium composite oxide B, the proportion of Ni was 55 mol %, the proportion of W was 0.5 mol %, 50% particle size D50 was 11.9 µm, 10% particle size D10 was 7.1 µm, and 90% particle size D90 was 21.1 µm or less.

A nonaqueous electrolyte secondary battery was produced in the same manner as that in Example 1, except that the above-produced Zr-free lithium composite oxide B containing Ni, Co, Mn, and W and lithium composite oxide A containing Ni, Co, Mn, W, and Zr in Example 1 were mixed together at a mass ratio of 7:3 and that the mixture was used as the positive electrode active material.

[Measurement of Battery Capacity]

At an environmental temperature of 25° C., each battery in Examples and Comparative Examples was charged at a constant current of 2000 mA, which equaled 1 It, until the battery voltage reached 4.2 V, and thereafter, charged at a constant voltage of 4.2 V. Then, each battery was discharged at a constant current of 2000 mA, which equaled 1 It, until the battery voltage reached 2.5 V. The discharge capacity at this time was regarded as the battery capacity (rated capacity).

[Measurement of Battery Power]

After each battery in Examples and Comparative Examples was charged to 50% of its rated capacity, the discharge cut-off voltage was set to 2 V, and the power at a state of charge (SOC) of 50% was determined from the following formula by using the largest current at which charging can be performed for 10 seconds at a battery temperature of 25° C.

power (SOC 50%)=(largest current)×(discharge cut-off voltage (2.0 V))

[Charging/Discharging Cycle Test]

At an environmental temperature of 45° C., each battery in Examples and Comparative Examples was charged at a constant current of 2000 mA, which equaled 1 It, until the battery voltage reached 4.2 V, and thereafter, charged at a constant voltage of 4.2 V. Then, each battery was discharged at a constant current of 2000 mA, which equaled 1 It, to 2.5 V. Such a charging/discharging cycle was performed 500 cycles. Then, capacity retention was calculated from the following formula.

capacity retention (%)=discharge capacity at 500th cycle/discharge capacity at 1st cycle×100

[Measurement Test of Amount of Gas Generated]

After each battery in Examples and Comparative Examples was subjected to 500 cycles of the above charging/discharging cycles, the amount of gas generated was measured by a buoyancy method. Specifically, the difference between the mass of the battery in water after 500 cycles and the mass of the battery in water before the test was regarded as the amount of gas generated.

Table 1 shows the results of the battery capacity, the battery power, and the amount of gas generated in each of Examples and Comparative Examples.

TABLE 1

| | Lithium composite oxide A | | | | | Lithium composite oxide B | | | | | | Battery characteristics | | | |
|---|---|---|---|---|---|---|---|---|---|---|---|---|---|---|---|
| | Particle size (μm) | | | Additive element content (mol %) | | Particle size (μm) | | | Additive element content (mol %) | | Mass ratio | Discharge capacity | Power characteristics | Capacity retention | Amount of gas |
| | D50 | D10 | D90 | Zr | W | D50 | D10 | D90 | Zr | W | B:A | (mAh) | (W) | (%) | (cm³) |
| Example 1 | 4.2 | 2.3 | 5.8 | 0.5 | 0.5 | 12.1 | 7.3 | 21.2 | 0.5 | 0.0 | 7:3 | 2052 | 71.9 | 90 | 3.8 |
| Example 2 | 4.2 | 2.3 | 5.8 | 0.5 | 0.5 | 12.1 | 7.3 | 21.2 | 0.5 | 0.0 | 8:2 | 2068 | 70.0 | 92 | 3.2 |
| Example 3 | 4.2 | 2.3 | 5.8 | 0.5 | 0.5 | 12.1 | 7.3 | 21.2 | 0.5 | 0.0 | 5:5 | 2001 | 75.3 | 88 | 4.3 |
| Example 4 | 4.2 | 2.3 | 5.8 | 0.5 | 0.5 | 17.0 | 8.6 | 21.7 | 0.5 | 0.0 | 7:3 | 2039 | 70.1 | 93 | 3.6 |
| Example 5 | 4.2 | 2.3 | 5.8 | 0.5 | 0.5 | 21.0 | 10.2 | 22.4 | 0.5 | 0.0 | 7:3 | 2021 | 69.0 | 92 | 3.0 |
| Example 6 | 4.2 | 2.3 | 5.8 | 0.5 | 0.5 | 10.0 | 7.0 | 20.9 | 0.5 | 0.0 | 7:3 | 2046 | 72.6 | 89 | 4.0 |
| Example 7 | 5.9 | 2.7 | 6.8 | 0.5 | 0.5 | 12.1 | 7.3 | 21.2 | 0.5 | 0.0 | 7:3 | 2058 | 68.9 | 91 | 2.6 |
| Example 8 | 2.7 | 1.3 | 4.4 | 0.5 | 0.5 | 12.1 | 7.3 | 21.2 | 0.5 | 0.0 | 7:3 | 2013 | 74.7 | 88 | 4.3 |
| Example 9 | 4.2 | 2.3 | 5.8 | 0.5 | 0.5 | 12.2 | 7.5 | 12.3 | 0.3 | 0.0 | 7:3 | 2057 | 72.0 | 89 | 3.9 |
| Example 10 | 4.0 | 2.0 | 5.6 | 0.3 | 0.5 | 12.1 | 7.3 | 21.2 | 0.5 | 0.0 | 7:3 | 2053 | 72.0 | 89 | 4.1 |
| Example 11 | 3.9 | 1.9 | 5.6 | 0.5 | 0.3 | 12.1 | 7.3 | 21.2 | 0.5 | 0.0 | 7:3 | 2052 | 69.0 | 90 | 2.9 |
| Example 12 | 4.2 | 2.3 | 5.8 | 0.5 | 0.5 | 12.1 | 7.3 | 21.2 | 0.0 | 0.0 | 7:3 | 2059 | 72.0 | 87 | 4.5 |
| Example 13 | 4.2 | 2.3 | 5.8 | 0.0 | 0.5 | 12.1 | 7.3 | 21.2 | 0.0 | 0.0 | 7:3 | 2055 | 72.0 | 85 | 5.9 |
| Example 14 | 4.1 | 2.3 | 5.7 | 0.0 | 0.5 | 12.1 | 7.3 | 21.2 | 0.5 | 0.0 | 7:3 | 2054 | 71.9 | 86 | 4.6 |
| Comparative Example 1 | 4.2 | 2.3 | 5.8 | 0.5 | 0.5 | 11.9 | 7.4 | 21.1 | 0.5 | 0.5 | 7:3 | 2020 | 72.2 | 89 | 5.0 |
| Comparative Example 2 | 4.2 | 2.3 | 5.8 | 0.5 | 0.5 | 11.9 | 7.4 | 21.1 | 0.5 | 0.5 | 9:1 | 2069 | 67.3 | 91 | 5.1 |
| Comparative Example 3 | 4.2 | 2.3 | 5.8 | 0.5 | 0.5 | 11.9 | 7.4 | 21.1 | 0.5 | 0.5 | 4:6 | 1977 | 74.0 | 85 | 6.9 |
| Comparative Example 4 | 4.2 | 2.3 | 5.8 | 0.5 | 0.5 | 25.3 | 12.0 | 29.3 | 0.5 | 0.0 | 7:3 | 1996 | 66.2 | 92 | 2.9 |
| Comparative Example 5 | 4.2 | 2.3 | 5.8 | 0.5 | 0.5 | 7.0 | 5.1 | 10.2 | 0.5 | 0.0 | 7:3 | 2023 | 73.9 | 89 | 4.9 |
| Comparative Example 6 | 7.0 | 4.9 | 9.9 | 0.5 | 0.5 | 12.1 | 7.3 | 21.2 | 0.5 | 0.0 | 7:3 | 2050 | 67.1 | 93 | 3.0 |
| Comparative Example 7 | 1.5 | 0.3 | 2.6 | 0.5 | 0.5 | 12.1 | 7.3 | 21.2 | 0.5 | 0.0 | 7:3 | 1990 | 75.2 | 87 | 5.0 |
| Comparative Example 8 | 4.0 | 2.2 | 5.6 | 0.0 | 0.5 | 11.9 | 7.4 | 21.1 | 0.5 | 0.5 | 7:3 | 2021 | 72.0 | 91 | 6.1 |
| Comparative Example 9 | 4.3 | 2.3 | 5.9 | 0.5 | 0.0 | 11.9 | 7.4 | 21.1 | 0.5 | 0.5 | 7:3 | 2022 | 64.9 | 88 | 3.2 |
| Comparative Example 10 | 4.2 | 2.3 | 5.8 | 0.5 | 0.5 | 11.9 | 7.1 | 21.1 | 0.0 | 0.5 | 7:3 | 2031 | 72.2 | 87 | 5.8 |

The positive electrode active materials in Examples 1 to 14 contain lithium composite oxide A containing W and Ni and W-free lithium composite oxide B containing Ni. Regarding the lithium composite oxide A, the proportion of Ni relative to the total moles of metal elements except for lithium is 30 to 60 mol %, 50% particle size D50 in the cumulative particle size distribution on a volume basis is 2 to 6 μm, 10% particle size D10 in the cumulative particle size distribution on a volume basis is 1.0 μm or more, and 90% particle size D90 in the cumulative particle size distribution on a volume basis is 6.8 μm or less. Regarding the lithium composite oxide B, the proportion of Ni relative to the total moles of metal elements except for lithium is 50 to 95 mol %, 50% particle size D50 in the cumulative particle size distribution on a volume basis is 10 to 22 μm, 10% particle size D10 in the cumulative particle size distribution on a volume basis is 7.0 μm or more, and 90% particle size D90 in the cumulative particle size distribution on a volume basis is 22.5 μm or less. The mass ratio of the lithium composite oxide A to the lithium composite oxide B is 1:1 to 1:5.7. The batteries in Examples 1 to 14 using such a positive electrode active material had characteristics including high battery capacity, high power, and a small amount of gas generated, compared with those in Comparative Examples 1 to 12, in which at least one of, for example, the above additive element, the above particle size, and the above mixture ratio was out of the above-defined range.

Among Examples 1 to 14, the capacity retention in the charging/discharging cycle characteristics was higher and the amount of gas generated was smaller in Examples 1 to 11, in which Zr was added to lithium composite oxide B, than in the other Examples. In Examples 4 and 5, in which lithium composite oxide B had a larger particle size, and in Example 7, in which lithium composite oxide A had a larger particle size, the capacity retention further increased, and the amount of gas generated decreased. In Examples 6 and 8, in which lithium composite oxide A or B had a smaller particle size, the power further increased. In Examples 1, 2, and 3, in which the mass ratios of lithium composite oxide A to lithium composite oxide B were different from each other, as the ratio of lithium composite oxide B increased, the capacity retention increased, and the amount of gas decreased. As the ratio of lithium composite oxide A increased, the power increased.

The invention claimed is:

1. A positive electrode active material for a nonaqueous electrolyte secondary battery, the positive electrode active material comprising lithium composite oxide A containing W and Ni and W-free lithium composite oxide B containing Ni, wherein, regarding the lithium composite oxide A, the proportion of Ni relative to the total moles of metal elements except for lithium is 30 to 60 mol %, 50% particle size D50 in a cumulative particle size distribution on a volume basis is 2 to 6 µm, 10% particle size D10 in a cumulative particle size distribution on a volume basis is 1.0 µm or more, and 90% particle size D90 in a cumulative particle size distribution on a volume basis is 6.8 µm or less, regarding the lithium composite oxide B, the proportion of Ni relative to the total moles of metal elements except for lithium is 50 to 95 mol %, 50% particle size D50 in a cumulative particle size distribution on a volume basis is 10 to 22 µm, 10% particle size D10 in a cumulative particle size distribution on a volume basis is 7.0 µm or more, and 90% particle size D90 in a cumulative particle size distribution on a volume basis is 22.5 µm or less, and a mass ratio of the lithium composite oxide B to the lithium composite oxide A is 1:1 to 5.7:1.

2. The positive electrode active material for a nonaqueous electrolyte secondary battery, according to claim 1, wherein regarding the lithium composite oxide A, the 50% particle size D50 is 2.5 to 4.5 µm, the 10% particle size D10 is 1.5 to 2.5 µm, and the 90% particle size D90 is 4.5 to 6.0 µm.

3. The positive electrode active material for a nonaqueous electrolyte secondary battery, according to claim 1, wherein regarding the lithium composite oxide B, the 50% particle size D50 is 11.0 to 21.5 µm, the 10% particle size D10 is 7.0 to 10.5 µm, and the 90% particle size D90 is 21.0 to 22.5 µm.

4. The positive electrode active material for a nonaqueous electrolyte secondary battery, according to claim 1, wherein at least one of the lithium composite oxide A and the lithium composite oxide B contains Zr.

5. A positive electrode for a nonaqueous electrolyte secondary battery, the positive electrode comprising the positive electrode active material for a nonaqueous electrolyte secondary battery according to claim 1.

6. A nonaqueous electrolyte secondary battery comprising the positive electrode for a nonaqueous electrolyte secondary battery according to claim 5.

* * * * *